Inventors:
JOHN W. McWILLIAMS and
PERCY R. MOSS,
by: John E. Jackson
their Attorney.

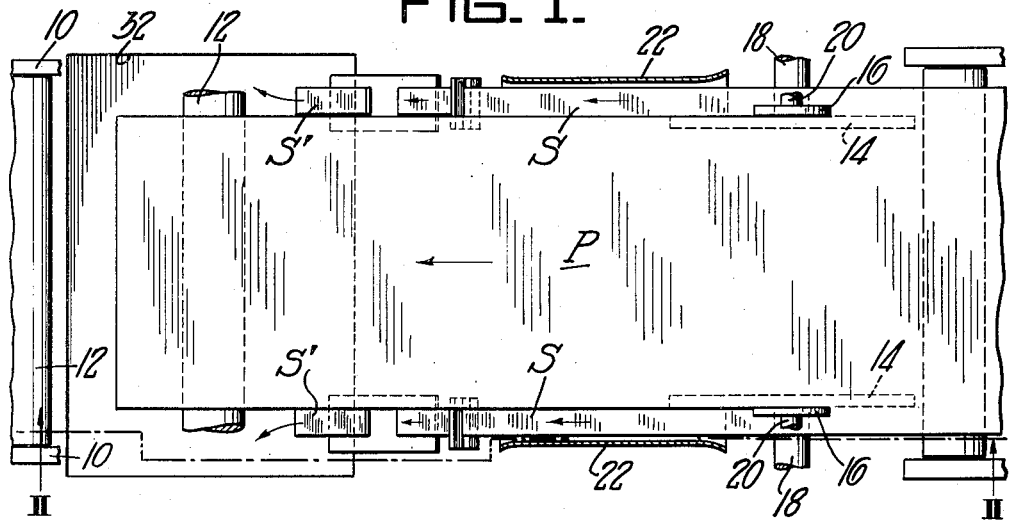

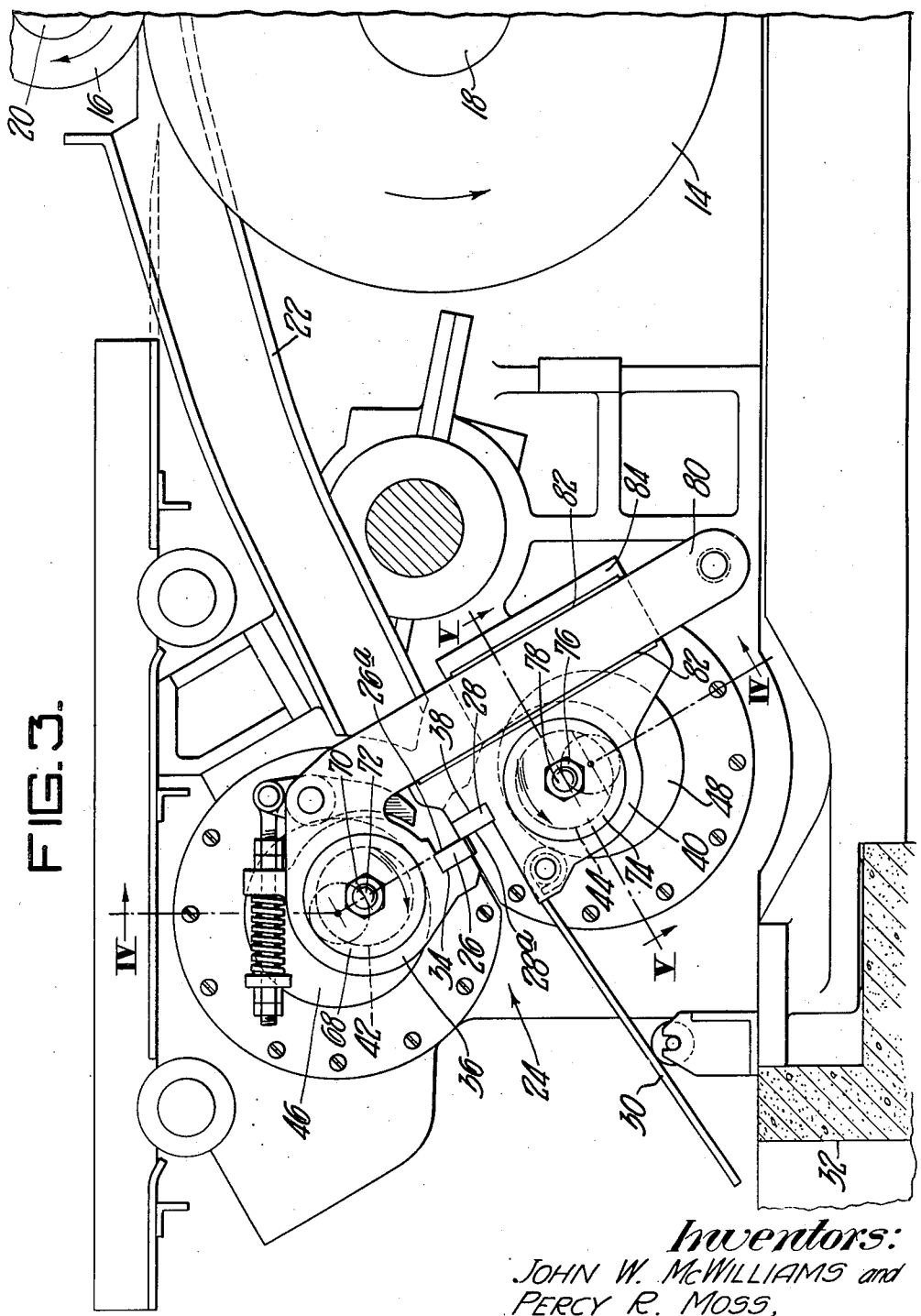

Jan. 30, 1945.    J. W. McWILLIAMS ET AL    2,368,152
SCRAP SHEAR
Filed April 13, 1944    4 Sheets-Sheet 4
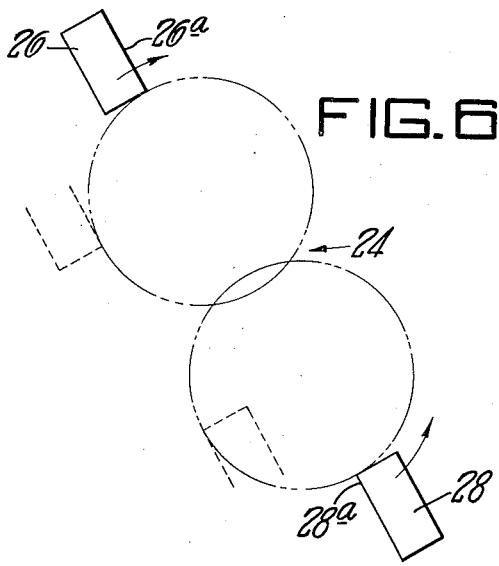
FIG. 6.
FIG. 8.
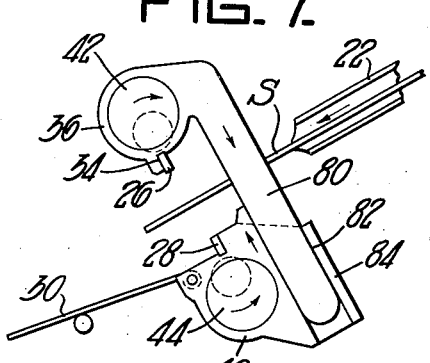
FIG. 7.
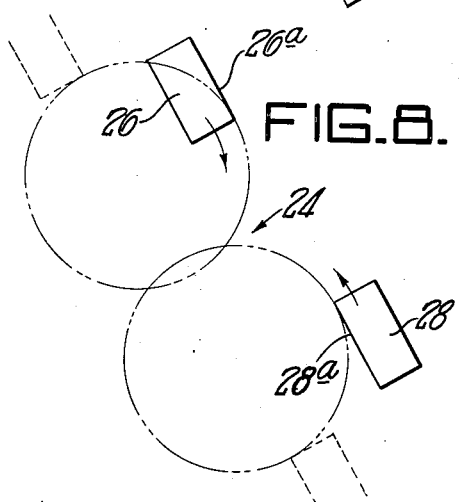
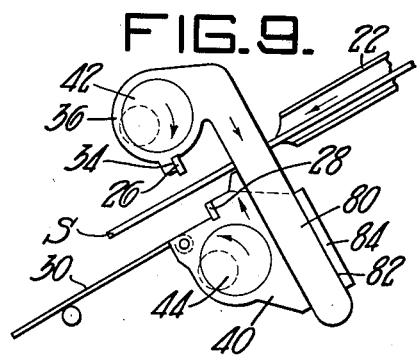
FIG. 9.
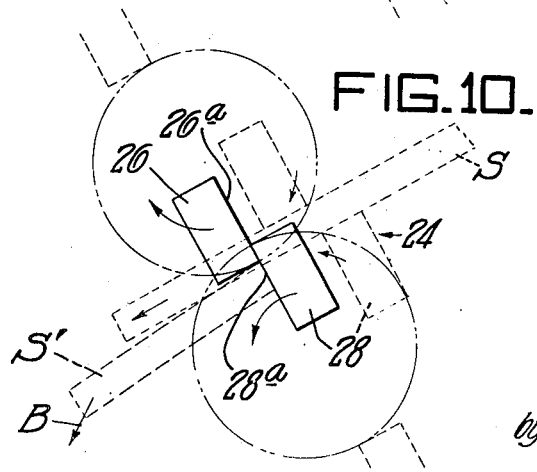
FIG. 10.
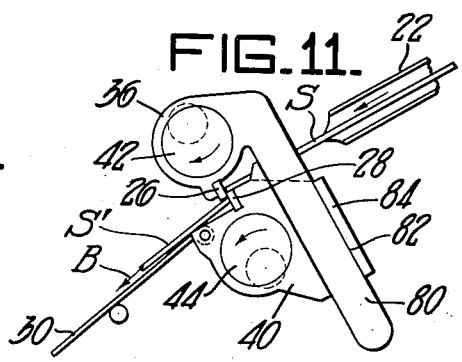
FIG. 11.
Inventors:
JOHN W. McWILLIAMS and
PERCY R. MOSS,
by: John E. Jackson
their Attorney.

Patented Jan. 30, 1945

2,368,152

UNITED STATES PATENT OFFICE 2,368,152

SCRAP SHEAR

John W. McWilliams and Percy R. Moss, Birmingham, Ala., assignors to Tennessee Coal, Iron and Railroad Company, a corporation of Tennessee Application April 13, 1944, Serial No. 530,860

4 Claims. (Cl. 164—10.6)

The present invention relates to improved features of construction and arrangement of a shear peculiarly well suited to cut a trimmed strip of scrap transversely into short pieces as it is side-trimmed from a longitudinally-advancing sheet or plate. For a full understanding of the improvements constituting the invention, reference should be made to the following detailed disclosure, the accompanying drawings, and the appended claims.

In the drawings:

Figure 1 is a plan view of apparatus for trimming marginal edges from a longitudinally advancing sheet or plate, showing means for cutting the trimmed scrap strip into smaller pieces, to facilitate handling and disposal.

Figure 2 is a section on line II—II of Figure 1.

Figure 3 is an enlarged fragmentary side elevation of a portion of Figure 1, illustrating the chief components of the herein claimed invention.

Figure 4:
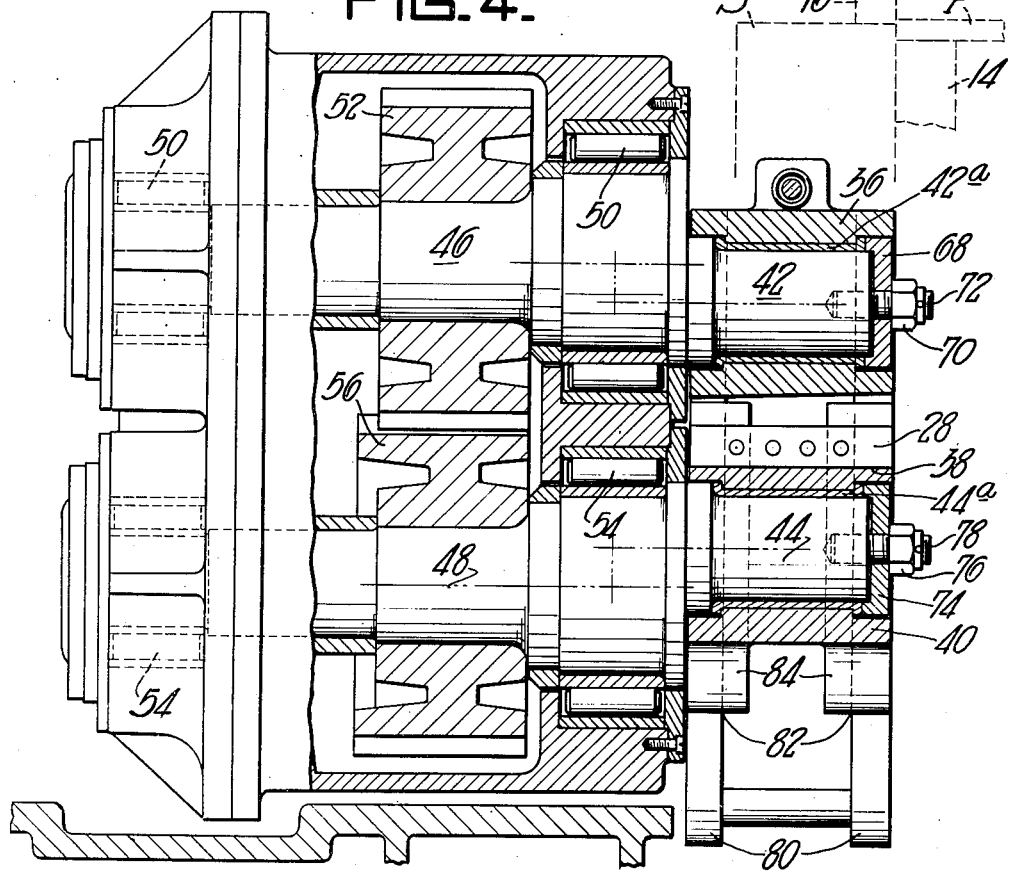
Figure 4 is a transverse section on line IV—IV of Figure 3.

Figures 6 to 11 inclusive are diagrammatic views illustrating different positions of the knife blades and showing that during all stages of the operating cycle thereof, their coacting opposed faces are accurately maintained in coplanar alignment while rotating in opposite circular paths.

Referring in detail to the embodiment of the invention illustrated, 10 represents a conventional form of conveyor table having a plurality of conveyor rolls 12 driven by any suitable means (not shown). The conveyor rolls are adapted to longitudinally advance a sheet or plate P as it comes from a rolling mill or similar metal processing device. Parallel marginal side portions of the advancing sheet or plate are arranged to be trimmed off by coacting circular side trimmer blades 14 and 16 secured to power-driven shafts 18 and 20. The two pairs of side trimmers 14 and 16 thus produce two marginal strips of scrap S.

The present invention is particularly directed to an improved construction and arrangement of parts for shearing each scrap strip S into small pieces. As each strip of scrap S is cut off, it is directed through a guide chute 22 to a scrap shearing station indicated generally at 24, where coacting knife blades 26 and 28 shear the scrap into smaller pieces S' which are discharged by rotation of the lower blade 28 onto a guide plate 30 which directs the pieces S' into a scrap pit 32.

The upper knife blade 26 is suitably secured to a notched seat 34 formed in an upper head 36. The lower knife blade 28 is similarly secured to a notched seat 38 formed in a lower head 40. The heads 36 and 40 are supported by respective crank pins 42 and 44 of upper and lower knife-operating shafts 46 and 48 respectively. The upper knife shaft 46 is rotatably supported in suitable antifriction bearings 50, and carries a gear 52 keyed or otherwise secured thereto. Similarly, the lower knife shaft 48 is rotatably supported in antifriction bearings 54 and has secured thereto a gear 56. The knife shafts 46 and 48 are adapted to be driven in substantial synchronism with the side shears 14 and 16, but at a slightly greater speed. Any suitable driving connection may be employed. By way of illustration we have shown a gear 58 secured to a countershaft 60 and meshing with and driving the gear 52, the shaft 60 carrying a sprocket 62 driven by a chain 64 from a sprocket 66 secured to the shaft 18 which, as above mentioned, is connected with any suitable power drive.

Figure 5:
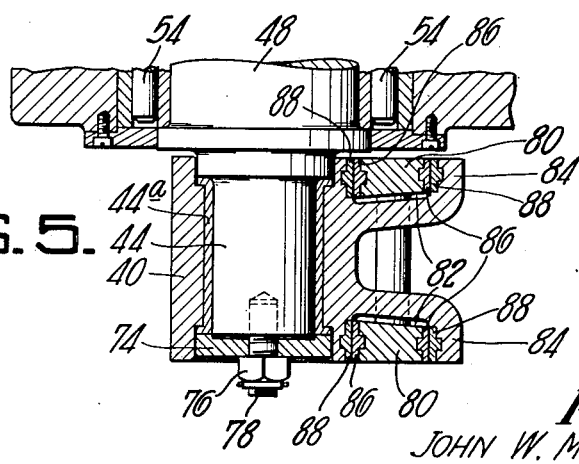
Figure 5 is a detail section on line V—V of Figure 3.

The crank pins 42 and 44 engage bearing sleeves 42ª and 44ª suitably seated in the heads 36 and 40. At the outer end of the crank pin 42 there is a retainer disc 68 which is secured thereto by a nut 70 carried by a stud 72 threaded into the extremity of the crank pin. Similarly, the lower head 40 is equipped with a retainer disc 74 secured to the end of the crank pin 44 by a nut 76 carried by a stud 78. The upper head 36 is provided with a pair of guide tongues 80 which slidingly engage a guideway or groove 82 formed in a guide portion 84 constituting an integral part of the lower head 40. To minimize wear, the coacting portions of the tongues 80 and the guide grooves 82 will usually be equipped with hardened steel gibs or strips 86 and 88, as shown in Figure 5.

With the parts constructed and arranged as shown and described, it will be apparent that as the side trimmers 14 and 16 rotate, marginal scrap strips S will be trimmed from the plate or sheet P. Each scrap strip S will be guided through a chute 22 to the scrap shear station where the knives 26 and 28 will cut it into small pieces S'. During this scrap shearing operation, the knife heads 36 and 40 have circular motions imparted thereto by the crank pins 42 and 44.

Because of the interengagement of the tongues 80 of the upper knife head with the guide portions 84 of the lower knife head, the opposed coacting faces 26ª and 28ª of the knives 26 and 28 are at all times maintained with precision in accurate coplanar alignment. This accurate alignment at different stages in the cutting cycle is graphically illustrated in Figures 6 to 11 inclusive. Figures 6 and 7 show the knife blades in the widest open position, when their respective operating cranks 42 and 44 are on dead center in positions most remote from one another; thus the scrap strip freely enters as fed along the guide chute. As clearly shown in Figures 2, 3, 7, 9 and 11, the coacting faces 26ᵃ and 28ᵃ of the knife blades lie in a common plane which coincides with the axial centers of the crank pins 42 and 44.

In Figures 8 and 9, the upper and lower knives and their respective supporting heads in the positions they occupy after the cranks have been turned through an angle of 90° from the positions of Figures 6 and 7, are illustrated. In this position it is clear that the coacting opposed faces 26ᵃ and 28ᵃ of the knives are in accurate coplanar alignment with one another. This is largely because of the guiding action of the tongue and guide portions of the upper and lower knife-supporting heads.

Figures 10 and 11 illustrate the positions of the knives upon completion of the shearing. In this view it is again noted that the faces 26ᵃ and 28ᵃ are still maintained in accurate alignment and true coplanar relation. As the crank pins 42 and 44 continue to rotate in the direction of the arrows in Figure 11, after shearing the scrap, the lower blade 28 will impart an impetus or outward feeding movement of the sheared-off piece, thus ejecting it positively, as indicated by the arrow B in Figures 10 and 11. Thus each successively sheared piece is forcibly ejected into the scrap pit 32.

As shown in Figure 3, the upper head 36 carries a pin 90 pivotally supporting a pawl-like element 92 carrying a spring loaded rod 94 adapted to yieldingly hold the element 92 in position to serve as a guide to prevent the oncoming end of the scrap from striking the top shear blade.

The described construction and arrangement overcome deficiencies inherent in the link-controlled type of scrap shears heretofore used. In prior known types of such shears, the knives are not maintained in alignment, and in fact during different stages of the shearing operation the angle between the work and the knives varies. This is because of necessary linkage used in prior types of scrap shears. Frequently wear in such linkage permits the knives to strike and interfere with each other, sometimes causing breakage of the knives or their operating mechanism. The positive guiding action of the coacting tongue and guide portions of our improved knife mountings herein shown, described, and claimed, obviates the breakage and materially cuts down maintenance and as a result of the invention approximately twenty per cent more production can be obtained on the rotary shear and the prolonged life of knife blades is made possible. Experience indicates that under the present invention the knives last approximately three times as long as when prior known mechanisms are used. The tongue and groove guiding means reduces wearing points to a minimum, and the design illustrated is such that the parts can be made in duplicate to operate on either the right or left sides of the rotary shear, thus making it unnecessary to provide the right- and left-hand spares heretofore required on prior types of shears.

Although an actual reduction to practice has demonstrated that the construction illustrated and described is highly desirable, we are not limited thereto, since various changes and modifications may be made within the scope of the appended claims.

We claim:

1. A scrap shear for cutting a trimmed strip of scrap transversely into short pieces, comprising coacting heads carrying respective knife blades, a pair of shafts having respective crank pins supporting and simultaneously imparting circular motions to said heads, and interengaging members and blade supports on said heads maintaining the opposed coacting faces of said knife blades in accurate alignment in a common plane passing through the axial centers of said crank pins as said blades approach toward and recede from one another during each shearing cycle.

2. A scrap shear for cutting a trimmed strip of scrap transversely into short pieces, comprising coacting heads carrying respective knife blades, and a pair of shafts having respective crank pins supporting and simultaneously imparting circular motions to said heads, one of said heads having a straight tongue slidably engaging a straight guideway formed in the other head so as to maintain the opposed coacting faces of the knife blades in alignment in a common plane passing through the axial centers of said crank pins as said blades approach toward and recede from one another during each shearing cycle.

3. A scrap shear for cutting a trimmed strip of scrap transversely into short pieces, comprising coacting heads carrying respective knife blades, a pair of shafts geared together to rotate in opposite directions and having respective crank pins supporting and imparting opposite circular motions to said heads, and interengaging members and blade supports on said heads maintaining the opposed coacting faces of said knife blades in accurate coplanar alignment with a plane passing through the axial centers of said crank pins as said blades approach toward and recede from one another during each shearing cycle.

4. In combination with means for longitudinally feeding a sheet or plate and trimming off a marginal scrap strip therefrom, a scrap shear for cutting up such scrap strip into short pieces, comprising coacting heads carrying respective knife blades, a pair of shafts geared together having respective crank pins supporting and simultaneously imparting opposite circular motions to said heads, and interengaging members and blade supports on said heads maintaining the opposed coacting faces of said knife blades in accurate alignment in a common plane passing through the axial centers of said crank pins as said blades approach toward and recede from one another during each shearing cycle.

JOHN W. McWILLIAMS.
PERCY R. MOSS.